United States Patent [19]

Bjorkman, Jr.

[11] Patent Number: 5,393,948
[45] Date of Patent: Feb. 28, 1995

[54] OPEN FACED TRAILING WELDING SHIELD

[75] Inventor: Gerald W. Bjorkman, Jr., Madison, Ala.

[73] Assignee: Martin Marietta, Denver, Colo.

[21] Appl. No.: 225,863

[22] Filed: Apr. 11, 1994

[51] Int. Cl.6 ............................................. B23K 9/167
[52] U.S. Cl. ..................................... 219/74; 219/75; 219/136; 228/219
[58] Field of Search ........................... 219/74, 75, 136; 228/219

[56] References Cited

U.S. PATENT DOCUMENTS

| | | | |
|---|---|---|---|
| 1,749,765 | 3/1930 | Hendrickson | 219/74 |
| 2,856,510 | 10/1958 | Jones et al. | 219/74 |
| 2,918,563 | 12/1959 | Ternisien et al. | 219/74 |
| 3,125,666 | 3/1964 | Gorman et al. | 219/74 |
| 4,436,977 | 3/1984 | Cash et al. | 219/74 |
| 4,599,505 | 7/1986 | Lukens et al. | 219/74 |
| 4,839,489 | 1/1989 | Dyer | 219/74 |
| 5,152,453 | 10/1992 | Leturno | 219/74 |

*Primary Examiner*—Clifford C. Shaw
*Attorney, Agent, or Firm*—John R. Duncan; Frank D. Gilliam

[57] ABSTRACT

An open faced trailing weld shield for constraining an inert gas to a welding puddle area and a solidifying weld area of a joint of abutting metal members that are reactive in the atmosphere at an elevated temperature while permitting viewing of such weld areas as a welding torch to which the shield is attached traverses the joint in a welding operation and permitting viewing of such weld areas to monitor the weld procedure and changing weld parameters as may be required. The shield includes a U-shaped tube member having closed end leg portions and a plurality of spaced downwardly opening aperture. A frame member closely surrounds the U-shaped tube member and is provided with a flared downwardly extending opening so that an inert gas that is introduced into the tube member flows downwardly to shield the weld puddle and the solidifying weld area until it has cooled sufficiently to be nonreactive with the atmosphere. The frame member is separably attached to a welding torch in alignment with the joint the torch is traversing in a welding operation so that the weld puddle and the solidifying weld area may be monitored by being viewed through the framed opening provided by the attachment of the frame member to the welding torch.

9 Claims, 2 Drawing Sheets

OPEN FACED TRAILING WELDING SHIELD

BACKGROUND OF THE INVENTION

1. Field of the invention

The invention relates generally to an improvement in the field of welding of metals reactive in the atmosphere during welding and more particularly, but not by way of limitation, to an open faced trailing weld shield for a welding torch that provides for viewing of the weld puddle and the solidifying weld while shielding such weld areas so that the weld procedure may be monitored as it is proceeding.

2. Prior Art

In the welding together of certain metals such as aluminum-lithium, titanium, certain steels, nickel and cobalt alloys a problem is encountered. As the welding process, such as plasma arc welding, gas tungsten arc welding, or gas metal arc welding, is conducted the weld puddle and the solidifying weld area must be suitably protected by an inert gas such as argon or helium since such metals, in the absence of a protective atmosphere, at an elevated temperature react with the oxygen in the atmosphere to form undesirable oxides.

The commonly used expedient in the prior art to overcome this problem is described at page 81 of the American Welding Society's Welding Handbook, Vol. 2, 8th Edition. In the absence of a controlled atmosphere welding chamber that has been purged of contaminants and replaced by a suitable shielding gas, the common expedient that is available for practical application in a production environment is a trailing shield. This trailing shield commonly includes a metal chamber having an open end that is configured to fit the surfaces to be welded or to suit the individual welder. A gas tungsten arc welding torch extends through the top of the shield for performing the welding procedure. A suitable inert gas is also introduced into the shield chamber to provide a protective inert gas shield for the solidifying weld as it cools to a temperature at which it is no longer reactive with the normal atmosphere. The shield chamber also preferably is packed with a suitable stainless steel wool or copper wool to provide a more even flow of inert gas to the work piece.

Unfortunately, the conventional trailing shield as described above suffers from a serious shortcoming. The weld operator in using the conventional shield, since the shield is closed to viewing, must wait until the weld emerges from the trailing edge of the shield and becomes visible to the operator or to a monitoring vision system. If there is a problem with the weld it is too late to change the welding parameters to correct the welding procedure. Obviously, such a welding procedure leaves something to be desired since the cost of scrap or rework of welded members of a very expensive metal is significant.

Accordingly, it is a general object of the present invention to provide a trailing shield for the welding of metals that are reactive with the atmosphere at an elevated temperature which provides viewing of the weld as it proceeds while yet providing a protective inert gas protective shield.

It is a further general object of the invention to provide a trailing shield that may be easily and separably attached to a welding torch which permits viewing of the welding operation in real time and immediate correction of any welding parameters that are not optimum.

It is a specific object of this invention to provide a practical, easily fabricated trailing weld shield that may be easily constructed for use with processes for welding reactive metals and that permits viewing of the weld puddle and solidifying weld area while the welding operation is being conducted in an inert gas shielding atmosphere.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates an arrangement to shield a weld puddle area and a solidifying weld area of a joint of abutting metal members that are reactive in the atmosphere at an elevated temperature and to permit viewing of the weld puddle area and the solidifying weld area for monitoring the welding operation as it is conducted. The arrangement includes a welding torch means which is positioned to traverse a joint of abutting metal members to form a weld puddle which gradually solidifies to form a weld. A trailing shield constructed in accordance with a preferred embodiment of the invention cooperates with the welding torch means and includes a U-shaped hollow member having and end portion and horizontally extending closed end leg portions, which leg and end portions are provided with a plurality of spaced downwardly opening apertures. A frame member closely surrounds the U-shaped hollow tube member and is provided with an enlarged flared downwardly extending opening that is spaced from the apertures provided in the leg portions of the tube member. A suitable supply of an inert gas such as helium or argon is coupled to the tube member for flooding the area beneath the tube member and frame member with a shield of inert gas. The frame member is separably secured to the torch means by a suitable bracket and clamp so that a framed opening is provided by the frame member and the welding torch. The frame member is secured to the welding torch so that the framed opening is aligned with the weld puddle and the solidifying weld puddle so that such areas may be viewed in real time as the welding torch traverses the metal joint in a welding operation and corrective action may be immediately taken if viewing of the weld areas indicates that optimum welding parameters are not being met. The viewing of the weld areas through the open faced welding shield may be by a welding operator or by an automated vision system.

Exemplary materials which are reactive in the atmosphere at elevated temperatures and with which the invention may be advantageously used are aluminum-lithium, titanium, steels, nickel, and cobalt alloys. The open faced welding shield may be used with processes for welding such metals as plasma arc welding, gas tungsten arc welding and gas metal arc welding.

The foregoing summary has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other shields for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE PREFERRED EMBODIMENT

Figure 1:
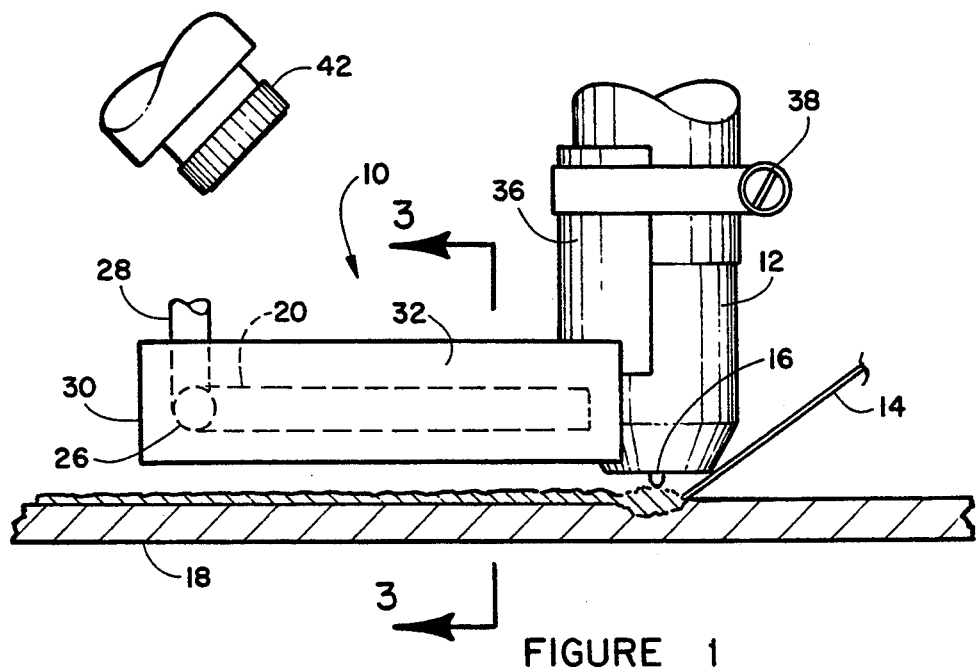
FIG. 1 is a side view of the open faced trailing weld shield of the instant invention as it is employed in a welding arrangement for reactive metals.

Referring now to the drawings in detail, and in particular to FIG. 1, reference character 10 generally designates an open faced trailing weld shield constructed in accordance with a preferred embodiment of the invention. The shield 10 is intended to be used in cooperation with a suitable welding torch 12 that uses suitable filler wire or welding rod 14 to form a weld puddle area 16 on a parent metal workpiece 18. The weld puddle 16 solidifies in a solidifying weld area 17 (see FIG. 2) as the welding torch 12 progresses in a predetermined path and cools into a hardened weld.

Figure 2:
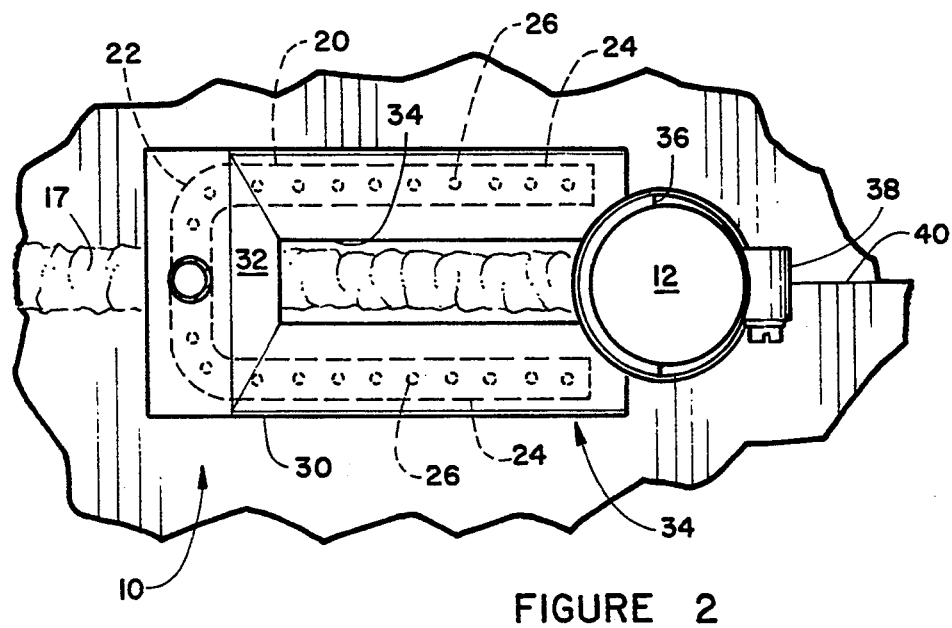
FIG. 2 is a plan view of the welding shield seen in FIG. 1.
Figure 3:
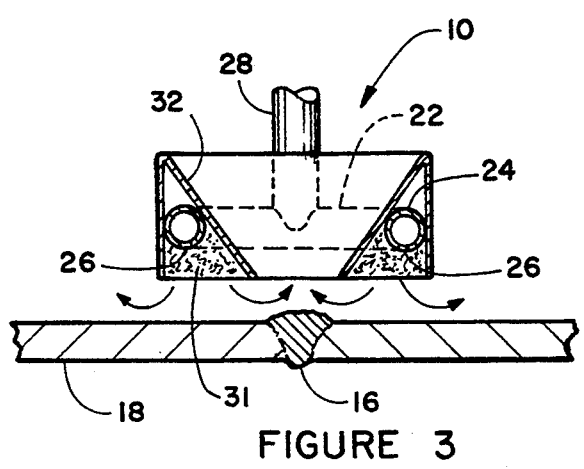
FIG. 3 is a sectional view taken along lines 3—3 in FIG. 3.

Referring now as well to FIGS. 2 and 3, it will be seen that the shield 10 includes a U-shaped tube member 20 which has an end portion 22 and two aligned horizontally extending leg portions 24 that are closed at their ends. The tube member 20 is provided with a plurality of spaced downwardly opening apertures 26. A supply of an inert gas such as argon or helium (not shown) is coupled to the tube member 20 by a suitable coupling 28.

A frame member 30 closely surrounds the tube member 20 and is provided with a U-shaped flared downwardly extending opening 32 which permits the gas flowing through the apertures 26 in the tube member to flow onto the weld puddle 16 and solidifying weld area 17 to shield such areas from the atmosphere when such areas are at an elevated temperature. The frame member 30 is provided with downwardly and inwardly extending wall portions 32 to provide a framed aperture 34 that has a size that is preferably slightly wider than the solidifying weld area 17 and sufficiently long to permit to permit a viewing of the weld puddle are 16 and the solidifying weld area 17. A wire screen 36 or other porous media is interposed on the lower opening of the frame member 30 to ensure an even flow of the inert gas therethrough. It would also be within the scope of the invention to pack the frame member 30 with stainless steel or copper wool 31 to also ensure an even gas flow therethrough so long as the apertures 26 in the tube member 20 were not blocked in any respect.

A suitable upwardly extending bracket 36 that is shaped to receive the welding torch 12 is attached to the frame member by any suitable means such as by welding. The bracket 36 and attached frame member 30 are separably secured to the torch 12 in any suitable manner such as by the illustrated hose clamp 38. As seen most clearly in FIG. 3, the open faced shield 10 is positioned on the torch 12 so that the framed opening 34 is aligned with the joint 40 between the abutting parent metal members 18 so that the weld puddle area 16 and the solidifying weld area 17 may be viewed therethrough in real time by a welding operator or an automated vision system 42 as exemplified by the illustrated camera. Thus, the weld areas are shielded by the inert gas flowing through the shield 10 during the welding operation as it proceeds and the weld areas are inspected simultaneously by a welding operator or vision system so that immediate corrective action may be taken if the inspected weld areas that are being monitored do not meet quality standards so that changes may be made in the welding parameters before the weld has proceeded to a point that the part needs to be scrapped or reworked.

The types of reactive metals which may be successfully utilized with the present invention are aluminum-lithium, titanium, steels, nickel, and cobalt alloys. The invention is readily applicable to plasma arc welding, gas tungsten arc welding and gas metal arc welding. Metals as those describe do not cool down quickly as the welding torch 12 traverses the seam 40 and in the absence of an inert gas shield would react with the atmosphere to form undesired oxides.

Figure 4:
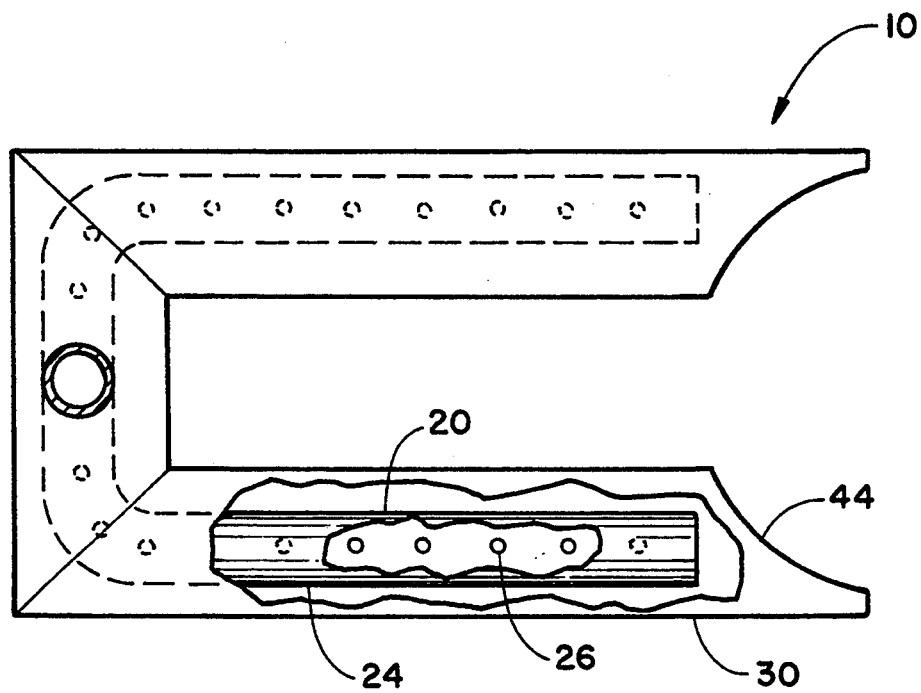
FIG. 4 is a plan view of the open faced trailing shield which illustrates how it may be easily modified to accommodate a welding torch of another configuration.
Figure 5:
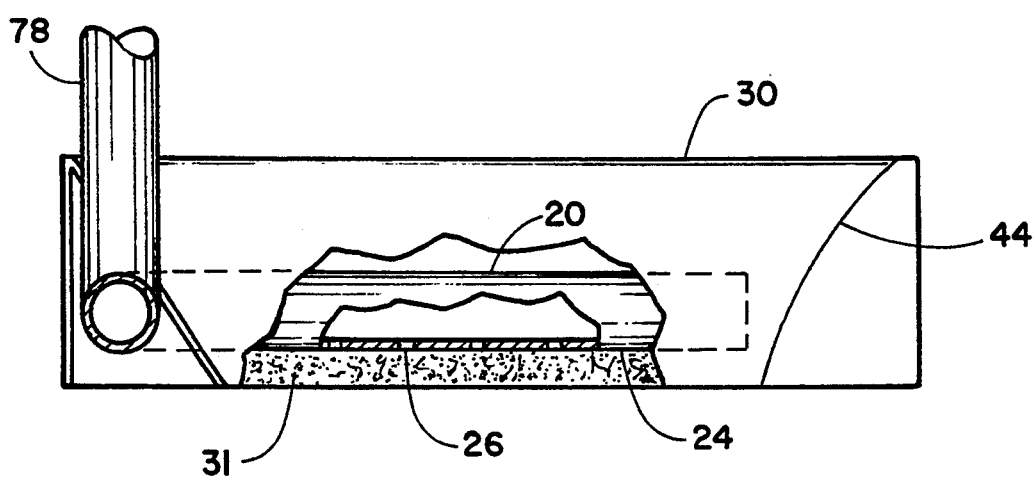
FIG. 5 is a side view of the modified trailing welding shield seen in FIG. 4.

The dimensions of the shield 10 of the instant invention are a function of the material that is being welded and the particular tooling that may be located adjacent to the weld joint. For example, FIGS. 4 and 5 show a shield 10 that is provided with a particularly annular downwardly opening shape 44 for welding aluminum-lithium alloys, such 2090 and 2195. Also, since materials such as steel cool much slower than aluminum alloys a longer version of the shield 10 would be required.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resort to without departing from the spirit and scope of the invention.

What is claimed is:

1. An open faced trailing weld shield system for directing an inert gas onto a weld puddle and solidifying weld bead adjacent to the puddle while permitting direct observation of the solidifying weld bead which comprises:

a U-shaped, closed end, hollow tube having two spaced leg portions;

means for directing an inert gas into said tube;

a U-shaped frame member closely enclosing said tube and having an open space between the legs of said U-shape providing an opening through the frame member adjacent to a solidifying weld bead;

a continuous opening on a first side of said frame member;

a plurality of apertures in said tube oriented in the direction of said first side of said frame member;

means for securing said frame member to a welding torch;

whereby in use said frame member lies generally parallel to and spaced from a solidifying weld bead being formed by said welding torch so that inert gas may be directed through said apertures to envelope said solidifying weld bead in inert gas while permitting viewing of said solidifying weld bead through said open space.

2. The open faced trailing weld shield of claim 1 wherein the frame member includes two inwardly and downwardly extending wall portions which at their terminus are spaced apart a distance slightly greater than the width of the solidifying weld area so as to permit ease in viewing such weld area from above the trailing weld shield.

3. The open faced trailing weld shield of claim 2 wherein the frame member includes a third inwardly and downwardly extending wall portion having an end portion that is coterminous with the other downwardly extending wall portions to create a longitudinally extending open center portion for viewing the weld puddle area and the solidifying weld area.

4. The open faced trailing weld shield of claim 3 wherein the downwardly extending openings formed by the wall portions of the frame member are covered by screen means though which the inert gas may evenly flow to shield the solidifying weld area from the atmosphere.

5. The open faced trailing weld shield of claim 1 wherein the inert gas being introduced into the tube member includes argon.

6. The open faced trailing weld shield of claim 1 wherein the inert gas being introduced into the tube member includes helium.

7. The open faced trailing weld shield of claim 1 wherein the securing means secures the frame member to a plasma arc welding torch.

8. The open faced trailing weld shield of claim 1 wherein the securing means secures the frame member to a gas tungsten arc welding torch.

9. The open faced trailing weld shield of claim 1 wherein the securing means secures the frame member to a gas metal arc welding torch.

* * * * *